United States Patent
Nishida

(10) Patent No.: US 8,218,872 B2
(45) Date of Patent: Jul. 10, 2012

(54) COMPUTER-READABLE MEDIUM STORING INFORMATION PROCESSING PROGRAM, INFORMATION PROCESSING METHOD AND INFORMATION PROCESSING SYSTEM

(75) Inventor: Kenichi Nishida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1049 days.

(21) Appl. No.: 12/056,933

(22) Filed: Mar. 27, 2008

(65) Prior Publication Data

US 2008/0298631 A1 Dec. 4, 2008

(30) Foreign Application Priority Data

May 30, 2007 (JP) ................................ 2007-143500

(51) Int. Cl.
*G06K 9/00* (2006.01)

(52) U.S. Cl. ........ 382/181; 382/100; 382/282; 707/627; 707/915; 707/626

(58) Field of Classification Search .................. 382/181, 382/100, 282; 707/627, 915, 626
See application file for complete search history.

(56) References Cited

U.S. PATENT DOCUMENTS

| | | | | |
|---|---|---|---|---|
| 2007/0154111 A1* | 7/2007 | Ikegami | ........................ | 382/282 |
| 2009/0002744 A1* | 1/2009 | Shimada | ...................... | 358/1.15 |

FOREIGN PATENT DOCUMENTS

| | | |
|---|---|---|
| JP | 10-021382 A | 1/1998 |
| JP | 2860392 B2 | 12/1998 |
| JP | 2001-291086 A | 10/2001 |
| WO | 2005-165795 A | 6/2005 |

OTHER PUBLICATIONS

Office Action dated Nov. 15, 2011, from the Japanese Patent Office, issued in counterpart Japanese Application No. 2007-143500.

* cited by examiner

*Primary Examiner* — Mike Rahmjoo
(74) *Attorney, Agent, or Firm* — Sughrue Mion, PLLC

(57) ABSTRACT

An information processing system includes an image output unit, an image reception unit, and a determination unit. The image output unit outputs an image to a document to include first and second images. The first image includes at least one of a character and a symbol which represent at least part of a pair of an attribute name and an attribute value which are included in electronic data. The second image includes a first information image representing at least part of the attribute value, or a second information image representing a storage location of the electronic data. The image reception unit receives the output image of the document and an image of a paper document. The determination unit determines as to whether or not allowing the image of the paper document to be registered.

20 Claims, 15 Drawing Sheets

FIG. 10

| 1001 | 1002 | 1003 | 1004 | 1005 | 1006 | 1007 | 1000 |
|---|---|---|---|---|---|---|---|
| DOCUMENT ID | DOCUMENT NAME | REGISTRATION LOCATION | ATTRIBUTE NAME | ATTRIBUTE VALUE | ATTRIBUTE NAME | ATTRIBUTE VALUE | ...... |
| | | | | | | | |
| | | | | | | | |

ORDER SHEET

FEBRUARY 1, 2007 — 1502

NO. : 07-001234 — 1503

TO △△△INC.

×××INDUSTRY INC. — 1504

PLACE ORDER AS FOLLOWS

| NAME OF ARTICLE | NUMBER OF ARTICLES | UNIT COST | SUM OF COST |
|---|---|---|---|
| ABC | 10 | 1,000 | 10,000 |
| EFG-100 | 3 | 10,000 | 30,000 |
|  |  |  |  |
|  |  |  |  |
| DELIVERY DUE DATE: FEBRUARY 20, 2007 | | TOTAL SUM OF COST | 40,000 |
| DESTINATION: OO, TAKATU-KU, KAWASAKI-CITY, KANAGAWA, JAPAN | | | |

FIG. 17

| ITEM | VALUE | COMMENTS |
|---|---|---|
| USER CONDITION | SPECIFIED | SPECIFIED: IT IS NECESSARY THAT USER ID OF REGISTRATION HEADER SHEET BE MATCHED WITH USER ID OF USER WHO LOGS IN<br><br>NOT SPECIFIED: USER CONDITION IS NOT CONSIDERED |
| CHARACTER RECOGNITION RANGE | FIRST PAGE | CAN SELECT ONE OF FIRST PAGE, ALL PAGES, AND AREA DESIGNATION |
| ATTRIBUTE MATCHING CONDITION | 1 | IT IS DETERMINED THAT DOCUMENT IS CORRECT IF ATTRIBUTES OF INDISPENSABLE ITEMS ARE MATCHED AND IF NUMBER OR MATCHED ATTRIBUTES OF OPTIONAL ITEMS ARE EQUAL TO OR MORE THAN VALUE DESIGNATED ON THE LEFT |

FIG. 18

| ATTRIBUTE NAME | LEVEL | CONDITIONS |
|---|---|---|
| TYPE OF DOCUMENT | INDISPENSABLE | COMPLETE MATCHING |
| No | INDISPENSABLE | COMPLETE MATCHING AFTER CONVERTING INTO HALF-WIDTH CHARACTER |
| CUSTOMER | OPTIONAL | TOP THREE CHARACTERS ARE MATCHED |
| TRANSACTION DATE | OPTIONAL | COMPLETE MATCHING AFTER CONVERTING INTO A.D. |

COMPUTER-READABLE MEDIUM STORING INFORMATION PROCESSING PROGRAM, INFORMATION PROCESSING METHOD AND INFORMATION PROCESSING SYSTEM

CROSS-REFERENCE TO RELATED APPLICATIONS

This application is based on and claims priority under 35 U.S.C. §119 from Japanese Patent Application No. 2007-143500 filed May 30, 2007.

BACKGROUND

1. Technical Field

The invention relates to a computer-readable medium storing an information processing program, an information processing method and an information processing system.

2. Related Art

A technique for reading a document with, for example, a scanner and storing the scanned images in a storage device, such as a hard disk, has been known.

SUMMARY

According to an aspect of the invention, an information processing method includes: outputting an image to a first document so that the image includes a first image that includes at least one of a character and a symbol which represent at least part of a pair of an attribute name and an attribute value which are included in electronic data, and a second image that includes (i) a first information image representing at least part of the attribute value included in the electronic data, or (ii) a second information image representing a storage location of the electronic data; receiving the output image of the first document and an image of a paper document; and determining as to whether or not allowing the image of the paper document to be registered, based on a result of analyzing (i) the second image included in the image of the received first document and (ii) the image of the received paper document.

BRIEF DESCRIPTION OF THE DRAWINGS

Detailed description of exemplary embodiments of the invention will be described below in detail with reference to the accompanying drawings, wherein:

FIG. 10 is a diagram illustrating an example of the data structure of a document management information table;

FIG. 15 is a diagram illustrating an example of an order sheet;

FIG. 17 is a diagram illustrating an example of criterion information;

FIG. 18 is a diagram illustrating an example of criterion information for each attribute.

DETAILED DESCRIPTION

Hereinafter, exemplary embodiments of the invention will be described with reference to the accompanying drawings.

Figure 1:
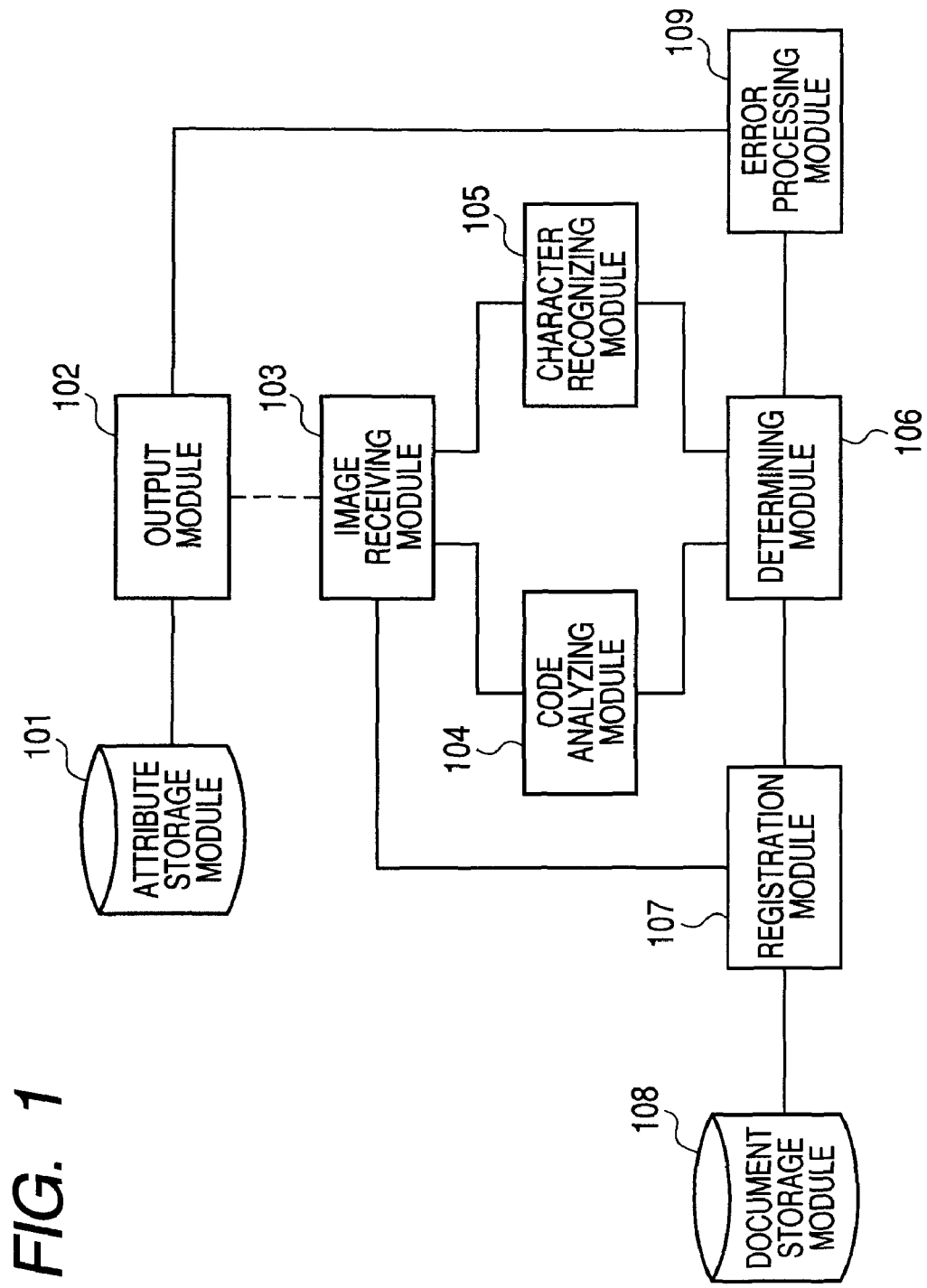
FIG. 1 is a conceptual block diagram illustrating the configuration of modules according to an exemplary embodiment of the invention.
Figure 2:
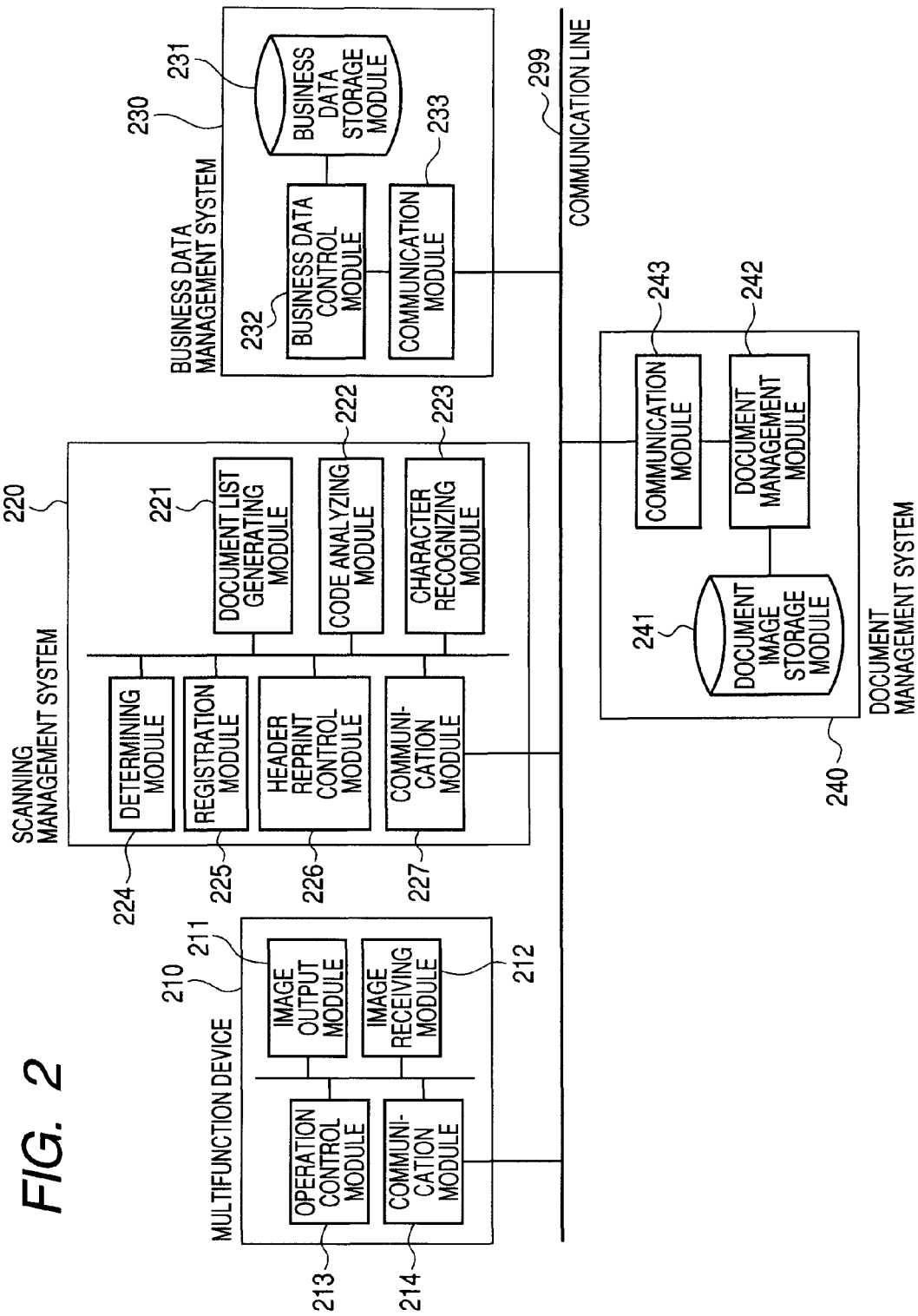
FIG. 2 is a conceptual block diagram illustrating the configuration of modules according to the exemplary embodiment of the invention, as seen from another viewpoint.
Figure 4:
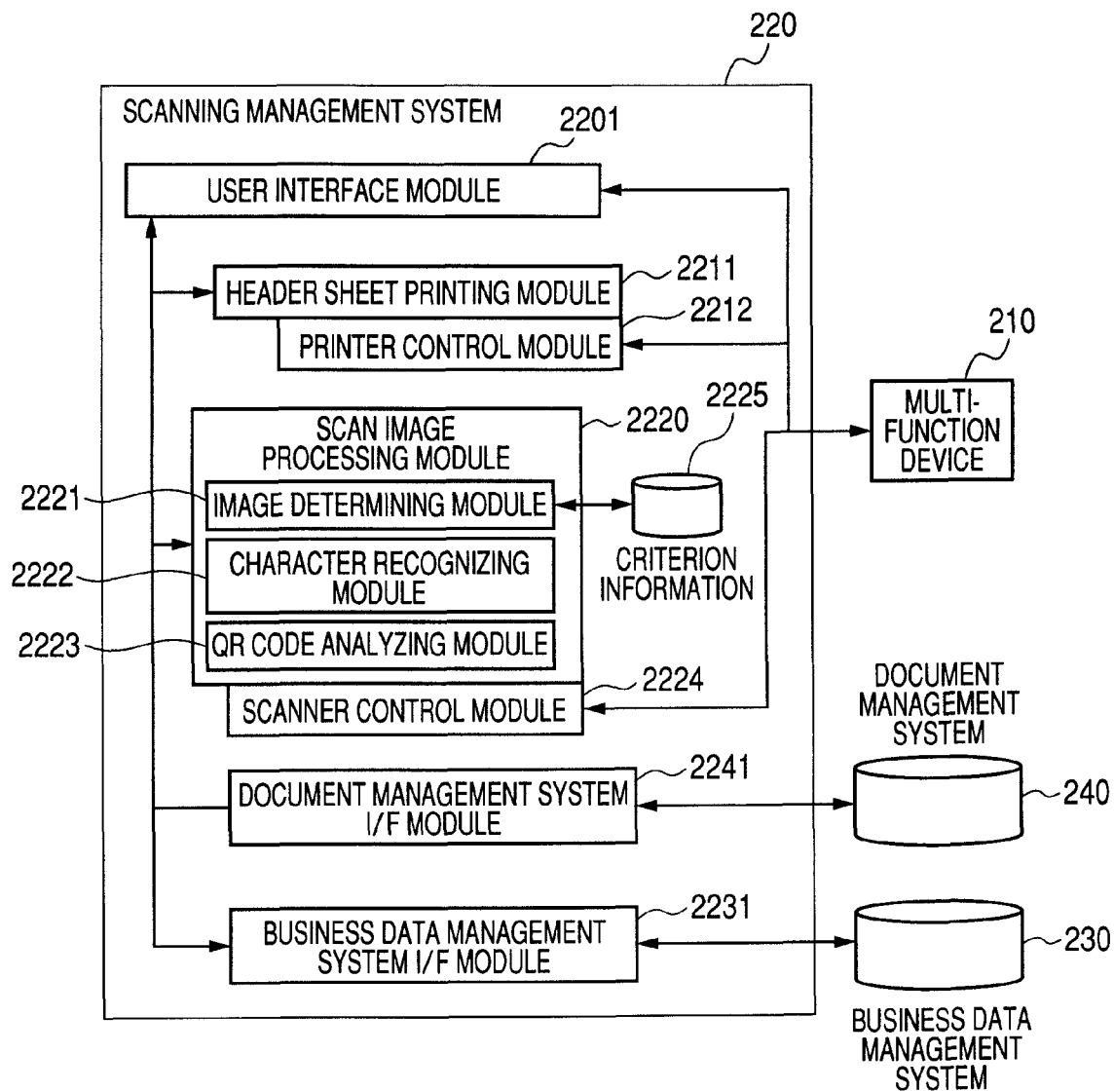
FIG. 4 is a conceptual block diagram illustrating the configuration of modules according to the exemplary embodiment of the invention, as seen from still another viewpoint.

FIG. 1 is a block diagram illustrating the conceptual configuration of modules according to an exemplary embodiment of the invention. In this exemplary embodiment, FIG. 1 is a block diagram of broader concept of a scanning management system 220, FIG. 2 is a block diagram of intermediate concept of the scanning management system 220, and FIG. 4 is a block diagram illustrating a lower concept of the scanning management system 220. The operations and effects of components in each concept will be described with reference to FIGS. 1, 2, and 4.

In this exemplary embodiment, the term 'modules' generally mean parts that can be logically separated, such as software (a computer program) or hardware. That is, in this exemplary embodiment, the module indicates a hardware component as well as a computer program. Therefore, in this exemplary embodiment, the module is used to describe a computer program, a system, and a method. However, for convenience of explanation, the terms 'store', 'cause to store', and equivalent words thereto are used in this exemplary embodiment, but, in the case of the computer program, the term 'store' means to store data in a storage device or to control a device to store data in a storage device in this exemplary embodiment. In addition, generally, one module corresponds to one function, but in actual implementation, one module may be formed of one program, plural modules may be formed of one program, or one module may be formed of plural programs. Further, plural modules may be executed by one computer, or one module may be executed by plural computers in a dispersion or parallel environment. Furthermore, one module may be included in another module. Further, in the following description, the term 'connection' includes physical connection and logical connection (for example, transmission/reception of data, instructions, and a reference relationship between data).

A system or an apparatus may include plural computers, hardware, and devices that are connected to one another by a communication unit, such as a network (which includes one-to-one correspondence communication connection), or it may include one computer, hardware, and devices.

This exemplary embodiment mainly describes an information processing system that receives images of paper documents relating to a business for internal control (computerized image data, which is also called an image or image data) and associates (hereinafter, may be referred to as 'links') the image data with (to) electronic data for business transactions.

Types of paper documents and contents described therein may be arbitral, but in this exemplary embodiment, documented evidence for proving a certain fact such as transaction will be mainly described as an example. For example, the documented evidence includes a written estimate, an order sheet, a statement of delivery, a receipt, a written contract, and a written application. Image media and paper documents may be formed of, for example, paper or electronic paper (thin display medium).

In this exemplary embodiment, a document to which an image is output also serves as a document separation sheet for indicating separation between documents, and may be referred to as a 'header sheet' in the following description.

Characters or symbols (hereinafter, referred to as 'characters') visually represent information that human can read. Specifically, the characters include Chinese characters, Japanese characters (Hiragana, Katakana, and Kanji characters) the alphabet, figures, icons, symbols and the like.

An information image includes codes other than the characters, which are systematically created in order to represent computer-readable electronic data. Specifically, the information images include bar codes, two-dimensional codes (for example, QR codes), glyph codes (which is disclosed in JP Hei.6-75795 A), digital watermarks, iTone (registered trademark, which stores electronic data in a halftone image by changing a form (for example, position and shape) of pixels constituting a single-lined screen or a dot screen to display gray-scale levels). In the following exemplary embodiment, QR codes are mainly used as an example of the information image.

The information image represents at least part of a pair of an attribute name and an attribute value or at least part of the attribute value. Also, the information image may represent a storage location of the pair of the attribute name and the attribute value. Specifically, the term 'storage location' includes, for example, a URL (uniform resource locator), a URI (uniform resource identifier), and a file name. The storage location may include an operator ID for identifying an operator (an identifier or an identification number). Also, the storage location may include other information items. In the following exemplary embodiments, the case where the information image represents at least part of the pair of the attribute name and the attribute value will mainly be described.

As shown in FIG. 1, this exemplary embodiment includes an attribute storage module 101, an output module 102, an image receiving module 103, a code analyzing module 104, a character recognizing module 105, a determining module 106, a registration module 107, a document storage module 108, and an error processing module 109.

The attribute storage module 101 is accessed by the output module 102 and stores electronic data including its attribute name and its attribute value. The electronic data may include an operator ID of an operator who should register an image of a paper document. The "operator who should register an image of a paper document" will be briefly described below. When an image of a paper document is registered, for a security reason, a person who has a right to access the paper document may be designated and requested to register the image of the paper document. The "designated person" is the "operator who should register an image of a paper document."

For example, the electronic data (e.g., QR code) may include an operator ID (a user ID) for identifying the designated person.

The output module 102 is connected to the attribute storage module 101 and the error processing module 109, and outputs an image to a document so that the image includes (i) a first image, which is characters that represent at least part of a pair of an attribute name and an attribute value included in the electronic data stored in the attribute storage module 101 and (ii) a second image, which is an information image. That is, the characters that represent at least part of the pair of the attribute name and the attribute value and the information image that represents at least part of the pair of the attribute name and the attribute value are printed on the document.

The output module 102 may be configured to output only one of the characters and the information image to the document.

The output module 102 may output, in accordance with information received from the error processing module 109, an image including the information image and information indicating that an image of a paper document is not registered to the document.

The output module 102 may output the information image further having an operator ID of an operator who should register an image of a paper document to the document.

The output module 102 may output an image to a document so that the image includes information which will be used by an operator to indicate that the operator has determined that the paper document is correct one.

The image receiving module 103 is connected to the code analyzing module 104, the character recognizing module 105, and the registration module 107. The image receiving module 103 receives the image of the paper document and the image of the document output from the output module 102, and transmits the image of the document to the code analyzing module 104 and the image of the paper document to the character recognizing module 105 and the registration module 107. The image receiving module 103 may transmit the image of the document to the character recognizing module 105.

Figure 16:
FIG. 16 is a diagram illustrating an example of a documented-evidence re-registration header sheet.

When receiving the image of the document that is output by the output module 102 so as to include the information image and the information indicating that the image of the paper document is not registered, the image receiving module 103 may receive the image of the document in the same manner as receiving the image of the previous document. Specifically, if a check box 1603 shown in FIG. 16 is checked and if an operator attempts to register a paper document again, the paper document is accepted as a correct documented evidence (which will be detailed later and corresponds to Yes in step S806 shown in FIG. 8).

The code analyzing module 104 is connected to the image receiving module 103 and the determining module 106, and analyzes the information image included in the image of the document received by the image receiving module 103. That is, for example, the code analyzing module 104 reads out electronic data written in the information image, and then transmits the read electronic data to the determining module 106. The read electronic data includes a pair of an attribute name and an attribute value. Alternatively, the read electronic data may be an attribute value. Furthermore, the read electronic data may include an operator ID.

The character recognizing module 105 is connected to the image receiving module 103 and the determining module 106, and analyzes the image of the paper document received by the image receiving module 103. That is, for example, the character recognizing module 105 performs character recognition for the image of the paper document, and converts characters written on the paper document into electronic data. Then, the character recognizing module 105 transmits the electronic data obtained by the character recognition to the determining module 106. The electronic data obtained by the character recognition includes a pair of an attribute name and an attribute value. Alternatively, the electronic data obtained by the character recognition may be an attribute value.

When receiving the image of the document from the image receiving module 103, the character recognizing module 105 may analyze the image, and transmit the analyzed result to the determining module 106.

Furthermore, the character recognizing module 105 may be configured to analyze if information, which is used by the operator indicating that the operator has determined that the paper document is correct one and which is included in the image of the document received by the image receiving module 103.

The determining module 106 is connected to the code analyzing module 104, the character recognizing module 105, the registration module 107, and the error processing module 109. The determining module 106 receives: the analysis result obtained by the code analyzing module 104, that is, the read electronic data; and the analysis result obtained by the character recognizing module 105, that is, the electronic data obtained by the character recognition. Then, the determining module 106 determines as to whether or not allowing the image of the paper document to be registered, based on the received analysis results. Specifically, for example, the determining module 106 determines as to whether or not the electronic data, which are the pair of the attribute name and the attribute value and which are received from the code analyzing module 104, are matched with the electronic data which are the pair of the attribute name and the attribute value and which are received from the character recognizing module 105 (the matching may be complete matching between the electronic data or may be partial matching therebetween), thereby determining as to whether allowing the image of the paper document to be registered. Alternatively, the determining module 106 may determine as to whether or not the electronic data, which is an attribute value and which is received from the code analyzing module 104, is matched with the electronic data, which is an attribute value and which is received from the character recognizing module 105 (the matching may be complete matching between the electronic data or may be partial matching therebetween), thereby determining as to whether or not allowing the image of the paper document to be registered. Then, the determining module 106 transmits the result of the determination to the registration module 107 or the error processing module 109. That is, when the determining module 106 determines that the image of the paper document is allowed to be registered, the determining module 106 causes the registration module 107 to register the image of the paper document. On the other hand, when the determining module 106 determines that the image of the paper document is not allowed to be registered, the determining module 106 causes the registration module 107 not to register the image of the paper document.

When receiving both the analysis result of the image of the document and the analysis result of the image of the paper document from the character recognizing module 105, the determining module 106 may determine as to whether or not allowing the image of the paper document to be registered, based on the two analysis results. In this case, the document to which the output module 102 outputs the image has characters written thereon, corresponding to the case where the document is not written.

The determining module 106 may determine as to whether or not allowing the image of the paper document to be registered, by comparing the operator ID of the information image included in the image of the document with an operator ID of an operator who is about to register the image of the paper document.

When information indicating that it is sure that the paper document is correct one is included in the image of the document, the determining module 106 may determine that the image of the paper document is allowed to be registered.

The registration module 107 is connected to the image receiving module 103, the determining module 106, and the document storage module 108, and receives the result determined by the determining module 106. When the determining module 106 determines that the image of the paper document is allowed to be registered, the registration module 107 registers the image of the paper document received from the image receiving module 103, in the document storage module 108. On the other hand, when the determining module 106 determines that the image of the paper document is not allowed to be registered, the registration module 107 does not register the image of the paper document received from the image receiving module 103. In this exemplary embodiment, the image of the paper document is registered in the document storage module 108, but the invention is not limited thereto. In order to register the image of the paper document, the image of the paper document may be transmitted to another apparatus or may be output.

The document storage module 108 is accessed by the registration module 107 and stores the image of the paper document.

The error processing module 109 is connected to the output module 102 and the determining module 106, and receives the result determined by the determining module 106. When the determining module 106 determines that the image of the paper document is not allowed to be registered, the error processing module 109 outputs an image to an document so that the image includes the second image that is output by the output module 102 and information indicating that the image of the paper document is not registered.

FIG. 2 is a conceptual block diagram illustrating the configuration of modules according to this exemplary embodiment (the block diagram of the intermediate concept).

As shown in FIG. 2, this exemplary embodiment includes a multifunction device 210, a scanning management system 220, a business data management system 230, a document management system 240, and these components are connected to each other through a communication line 299.

The multifunction device 210 includes an image output module 211, an image receiving module 212, an operation control module 213, and a communication module 214, which are connected to one another. The communication module 214 is connected to a communication module 227 of the scanning management system 220, a communication module 233 of the business data management system 230, and a communication module 243 of the document management system 240 through the communication line 299.

The multifunction device 210 is also called a multifunction copying machine, and is an image processing apparatus having two or more functions among a scanner, a printer, a copying machine, and a facsimile. In this exemplary embodiment, the image output module 211 has the function of the printer, and the image receiving module 212 has the function of the scanner or the facsimile. That is, the image output module 211 corresponds to the output module 102 shown in FIG. 1, and prints images transmitted from the scanning management system 220. The image receiving module 212 corresponds to the image receiving module 103 shown in FIG. 1, and reads the image printed by the image output module 211, reads a paper document, which is a documented evidence, and/or receives the image transmitted from the scanning management system 220.

The operation control module 213 receives instructions that are input to the multifunction device 210 by an operator, and controls, for example, the image output module 211. Also, the operation control module 213 displays a result of a process performed by the image output module 211, on a display device, such as a control panel, provided in the multifunction device 210.

The communication module 214 receives information (for example, images and instructions) from the scanning management system 220 and the like and transmits the information to the image receiving module 212 and the like. Also, the communication module 214 transmits information (for example, images and instructions) received from the image receiving module 212 and the like, to the scanning management system 220 and the like.

The scanning management system 220 includes a document list generating module 221, a code analyzing module 222, a character recognizing module 223, a determining module 224, a registration module 225, a header reprint control module 226, and the communication module 227, which are connected to one another. The communication module 227 is connected to the communication module 214 of the multifunction device 210, the communication module 233 of the business data management system 230, and the communication module 243 of the document management system 240 through the communication line 299.

In order to identify an image of a documented evidence to be registered in the document management system 240, the document list generating module 221 extracts a list of pairs of attribute names and attribute values stored in a business data storage module 231 of the business data management system 230 through the communication module 227, and transmits the list to the operation control module 213 of the multifunction device 210 through the communication module 227. Then, the image output module 211 of the multifunction device 210 creates an image to be output to an document. That is, the image output module 211 creates characters and/or an information image, which represents at least part of a pair of an attribute name and an attribute value. The information image may represent at least part of the attribute value. The information image may be transmitted to the multifunction device 210 through the communication module 227.

The code analyzing module 222 corresponds to the code analyzing module 104 shown in FIG. 1, and the character recognizing module 223 corresponds to the character recognizing module 105 shown in FIG. 1. The determining module 224 corresponds to the determining module 106 shown in FIG. 1, and the registration module 225 corresponds to the registration module 107 shown in FIG. 1. The header reprint control module 226 corresponds to the error processing module 109 shown in FIG. 1.

The communication module 227 receives information (for example, an image, a command and the like) from the multifunction device 210 and the like and transmits the received information to the determining module 224 and the like. Also, the communication module 227 receives information (for example, an image, a command and the like) from the document list generating module 221 and the like and transmits the received information to the multifunction device 210 and the like.

The business data management system 230 includes the business data storage module 231, a business data control module 232, and the communication module 233, which are connected to one another. The communication module 233 is connected to the communication module 214 of the multifunction device 210, the communication module 227 of the scanning management system 220, and the communication module 243 of the document management system 240 through the communication line 299.

The business data management system 230 processes electronic data necessary for businesses, such as financial management and sales management.

The business data storage module 231 corresponds to the attribute storage module 101 shown in FIG. 1, and stores plural pieces of electronic data each including (i) a pair of an attribute name and an attribute value and (ii) an operator ID of an operator who should register an image of a paper document.

The business data control module 232 receives a command from the scanning management system 220 and the like through the communication module 233, and accesses the business data storage module 231 according to the received command to extract electronic data which includes a pair of an attribute name and an attribute value and which is stored in the business data storage module 231. Then, the business data control module 232 transmits the read electronic data to the scanning management system 220 and the like through the communication module 233. Also, the business data control module 232 stores electronic data that is received through the communication module 233, in the business data storage module 231.

The communication module 233 receives information (for example, electronic data, a command and the like) from the scanning management system 220 and the like and transmits the received information to the business data control module 232. Also, the communication module 233 transmits information (for example, electronic data, a command and the like) that is received from the business data control module 232, to the scanning management system 220 and the like.

The document management system 240 includes a document image storage module 241, a document management module 242, and the communication module 243, which are connected to one another. The communication module 243 is connected to the communication module 214 of the multifunction device 210, the communication module 227 of the scanning management system 220, and the communication module 233 of the business data management system 230 through the communication line 299.

The document management system 240 is a database that stores images.

The document image storage module 241 corresponds to the document storage module 108 shown in FIG. 1, and stores images of paper documents, which are documented evidence. These images are associated with the electronic data stored in the business data storage module 231 of the business data management system 230.

The document management module 242 receives an image and the like from the scanning management system 220 and the like through the communication module 243, and stores the received image and the like in the document image storage module 241. Also, the document management module 242 transmits an image to the scanning management system 220 and the like through the communication module 243.

The communication module 243 receives information (for example, an image, a command and the like) from the scanning management system 220 and the like and transmits the received information to the document management module 242. Also, the communication module 243 transmits information (for example, an image, a command and the like) received from the document management module 242, to the scanning management system 220 and the like.

In the exemplary embodiment shown in FIG. 2, the multifunction device 210, the scanning management system 220, the business data management system 230, and the document management system 240 are separately provided, but combinations thereof may be changed according to a purpose. For example, the following combinations may be made: the multifunction device 210, the scanning management system 220, the business data management system 230, and the document management system 240 are integrated into one system; the multifunction device 210, the scanning management system 220, and the business data management system 230 are integrated into one system; the multifunction device 210 and the scanning management system 220 are integrated into one system; the scanning management system 220 and the business data management system 230 are integrated into one system; and the business data management system 230 and the document management system 240 are integrated into one system. Also, the multifunction device 210 may be separated into (i) an image output system (specifically, for example, a printer) having the image output module 211 as its main component and (ii) an image input system (specifically, for example, a scanner) having the image receiving module 212 as its main component.

FIG. 4 is a conceptual block diagram illustrating the configuration of modules of the scanning management system 220 according to the exemplary embodiment of the invention (the block diagram of the lower concept).

The scanning management system 220 includes a user interface module 2201, a header sheet printing module 2211, a printer control module 2212, a scan image processing module 2220, a scanner control module 2224, criterion information 2225, a business data management system I/F module 2231, and a document management system I/F module 2241.

The communication module 227 shown in FIG. 2 corresponds to the user interface module 2201, the printer control module 2212, the scanner control module 2224, the document management system I/F module 2241, and the business data management system I/F module 2231. That is, the user interface module 2201, the printer control module 2212, and the scanner control module 2224 communicate with the multifunction device 210; the document management system I/F module 2241 communicates with the document management system 240; and the business data management system I/F module 2231 communicates with the business data management system 230.

The user interface module 2201 is connected to the header sheet printing module 2211, the scan image processing module 2220, the business data management system I/F module 2231, the document management system I/F module 2241, and the multifunction device 210. The user interface module 2201 receives an operation of an operator of the scanner management system 220, transmits a command to the respective modules, receives process results from the respective modules, and displays the process results on the display device. Also, the user interface module 2201 receives a process result from by the multifunction device 210 and an operation of the operator. Also, the user interface module 2201 transmits a command to the multifunction device 210.

The document list generating module 221 and the header reprint control module 226 shown in FIG. 2 correspond to the header sheet printing module 2211 and the printer control module 2212.

The header sheet printing module 2211 is connected to the printer control module 2212, the user interface module 2201, the scan image processing module 2220, the business data management system I/F module 2231, and the document management system I/F module 2241.

In accordance with an operation of the operator, the header sheet printing module 2211 receives a command from the user interface module 2201, and performs control so that the multifunction device 210 prints a header sheet. The header sheet printing module 2211 creates an image, such as characters and/or an information image, that represents an attribute name and an attribute value that are to be printed on the header sheet. In order to perform this creating and this printing, the header sheet printing module 2211 receives the attribute name and the attribute value from the business data management system I/F module 2231. Also, the header sheet printing module 2211 causes the multifunction device 210 to print a header sheet for scanning a documented evidence again, based on a determination result made by the scan image processing module 2220. The header sheet printing module 2211 may receive a print command from, for example, the document management system I/F module 2241 and may cause the multifunction device 210 to print a document other than the header sheet.

The printer control module 2212 is connected to the header sheet printing module 2211 and the multifunction device 210. The printer control module 2212 receives the print command from the header sheet printing module 2211 and performs control so that the multifunction device 210 prints the header sheet.

The scan image processing module 2220 is connected to the scanner control module 2224, the user interface module 2201, the header sheet printing module 2211, the business data management system I/F module 2231, and the document management system I/F module 2241. The scan image processing module 2220 includes an image determining module 2221, a character recognizing module 2222, and a QR code analyzing module 2223.

The scan image processing module 2220 transmits a scan command to the scanner control module 2224 using modules provided therein. Also, the scan image processing module 2220 receives an image scanned by the multifunction device 210 from the scanner control module 2224 and causes the respective modules to perform their processes for the received image. In addition, the scan image processing module 2220 transmits the process results to the user interface module 2201, the header sheet printing module 2211, the business data management system I/F module 2231, and the document management system I/F module 2241.

The character recognizing module 223 shown in FIG. 2 corresponds to the character recognizing module 2222.

The code analyzing module 222 shown in FIG. 2 corresponds to the QR code analyzing module 2223.

The determining module 224 and the registration module 225 shown in FIG. 2 correspond to the image determining module 2221. The image determining module 2221 may determine as to whether an image of a documented evidence includes an attribute name and an attribute value that are written on a header sheet, based on the criterion information 2225. The criterion information 2225 will be described below with reference to FIGS. 17 and 18.

The scanner control module 2224 is connected to the scan image processing module 2220 and the multifunction device 210. The scanner control module 2224 receives a scan command from the scan image processing module 2220 and performs control so that the multifunction device 210 scans a header sheet and a documented evidence. Also, the scanner control module 2224 receives the images scanned by the multifunction device 210, and transmits the received images to the respective modules provided in the scan image processing module 2220.

The business data management system I/F module 2231 is connected to the user interface module 2201, the header sheet printing module 2211, the scan image processing module 2220, the document management system I/F module 2241, and the business data management system 230. The business data management system I/F module 2231 transmits, for example, the attribute name and the attribute value, which are stored in the business data management system 230, to the header sheet printing module 2211 according to a command from the user interface module 2201, the header sheet printing module 2211 and the like.

The document management system I/F module 2241 is connected to the user interface module 2201, the header sheet printing module 2211, the scan image processing module 2220, the business data management system I/F module 2231, and the document management system 240. The document management system I/F module 2241 stores an image received from the scan image processing module 2220 in the document management system 240 according to a command from the scan image processing module 2220, the user interface module 2201, the business data management system I/F module 2231 and the like.

Although the correspondence relation among the modules shown in FIGS. 1, 2, and 4 has been described above, the described correspondence relation is just a non-limited example. For example, the registration module 107 may correspond to the document management module 242, the communication module 243 and the like.

Figure 3:
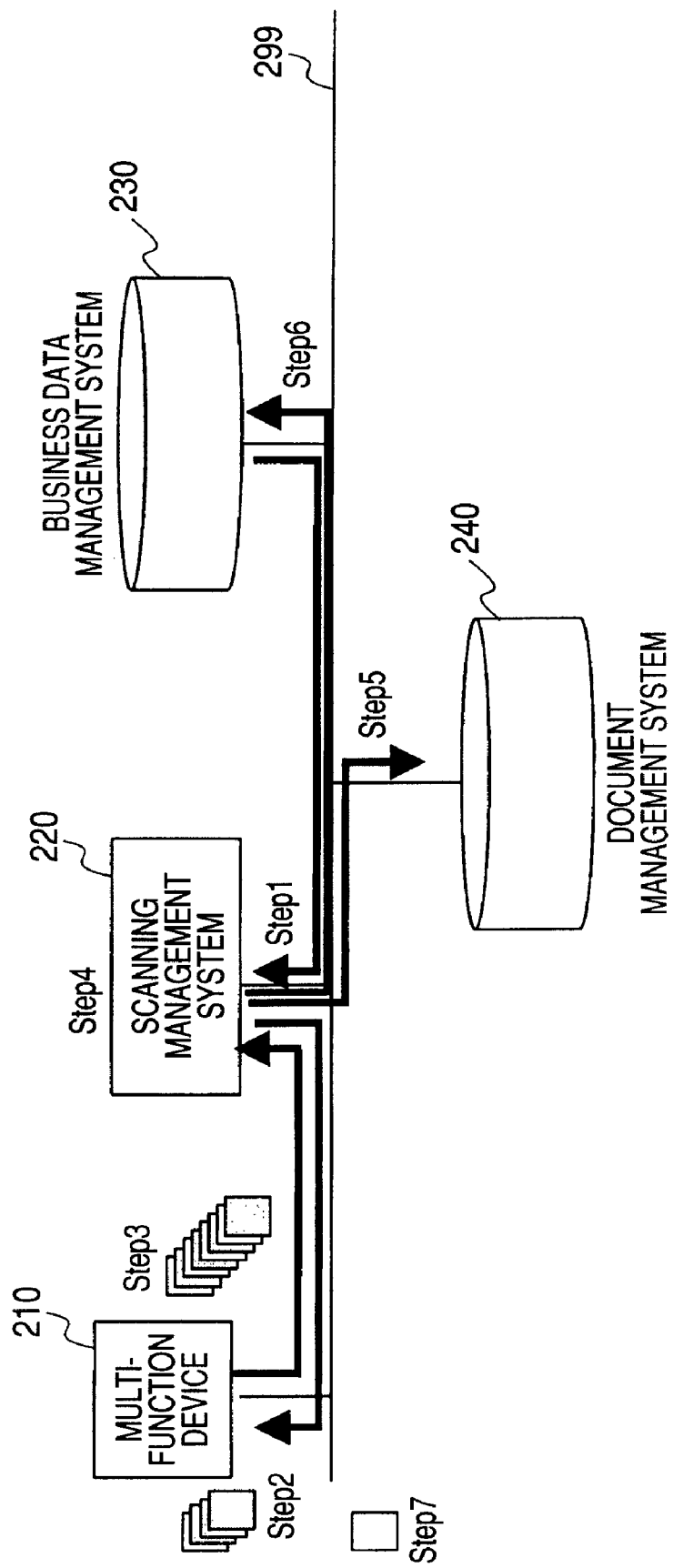
FIG. 3 is a diagram illustrating an example of a process according to the exemplary embodiment of the invention.

Next, the operation of the system shown in FIG. 2 will be described with reference to FIG. 3.

Step 1: The scanning management system 220 acquires a list of documented evidences to be scanned from the business data management system 230.

Step 2: The multifunction device 210 selects documented evidences to be scanned according to an operation of an operator, and collectively prints header sheets corresponding thereto. The multifunction device 210 converts into a QR code (i) a value that indicates that each header sheet is a header sheet, (ii) an attribute name and an attribute value of an attribute (for example, a document name, the type of document, transaction date, a customer, an account number, a transaction amount, and a summary) for identifying the corresponding documented evidence to be scanned, and (iii) information for designating a registration destination in the document management system 240, and prints the QR code on each header sheet. The attribute value may be included in information to be converted into the QR codes, but the attribute name may not be included therein. The multifunction device 210 prints the attribute name and the attribute value as characters that the operator can read.

Step 3: The operator collects a documented evidence using the attribute name and the attribute value written on the header sheet, and creates a set of the header sheet and the documented evidence that follows and overlaps the header sheet. In this way, the operator prepares plural sets. Then, the multifunction device 210 collectively scans the plural sets using an ADF (auto document feeder) according to an operation of the operator. Then, the multifunction device 210 transmits the scanned images to the scanning management system 220.

Step 4: Of the received images, the scanning management system 220 reads the attribute name and the attribute value, which are encoded into the QR code on each header sheet. Also, the scanning management system 220 performs character recognition for the corresponding document (corresponding documented evidence), which follows each header sheet, and converts the corresponding document into text data. When the attribute name and the attribute value, which are encoded into the QR code, are included in the text data obtained by the character recognition, it is determined that the corresponding documented evidence is correct. Alternatively, when the attribute value encoded into the QR code is included in the text data obtained by the character recognition, it may be determined that the corresponding documented evidence is correct.

Step 5: When it is determined in Step 4 that the documented evidence is correct, the scanning management system 220 registers the image of the documented evidence at a designated registration location in the document management system 240.

Step 6: The scanning management system 220 notifies information indicating the registration location, to the business data management system 230 that manages transaction data, and associates the transaction data with the scanned image of the documented evidence.

Step 7: When it is determined in Step 4 that the attribute of the scanned documented evidence is not matched with that of the corresponding header sheet and the documented evidence is incorrect, the scanning management system 220 prints the header sheet again. In this case, information indicating that what attribute is not matched and thus it is determined that the documented evidence is incorrect is also printed on the header sheet that is printed again.

Then, the operator collects a documented evidence required to be scanned again, and performs the scanning process of Step 3 again.

Figure 5:
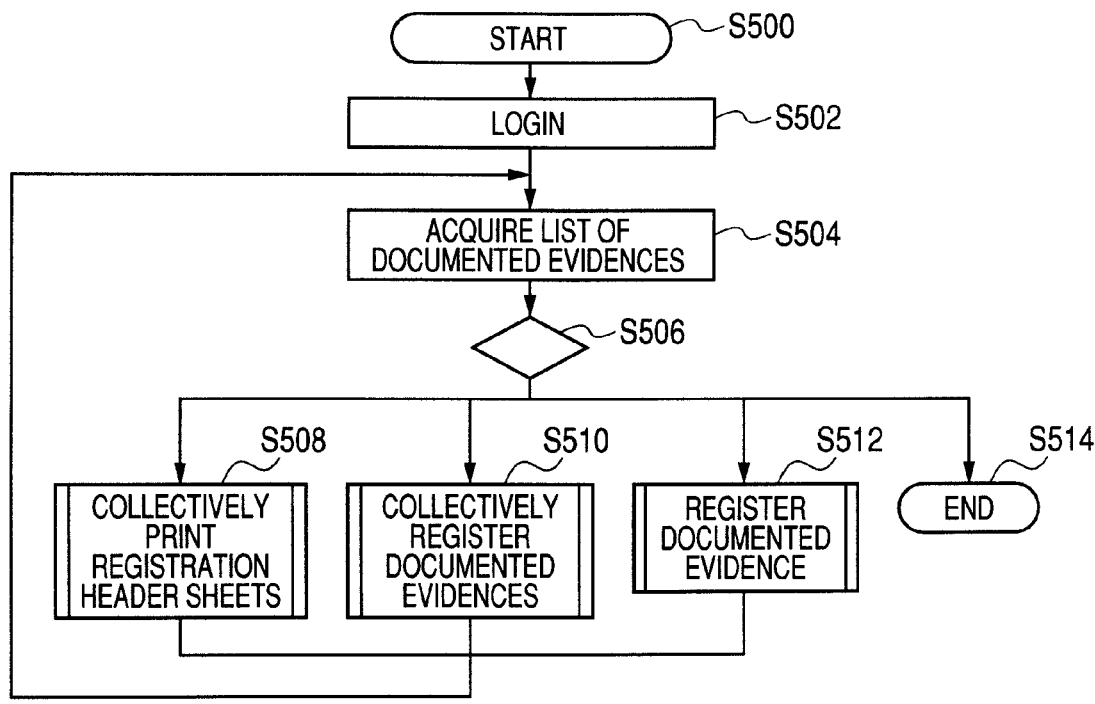
FIG. 5 is a flow chart illustrating an example of a process performed by a multifunction device.

Next, the operation of the multifunction device 210 will be described with reference to a flow chart shown in FIG. 5.

Figure 11:
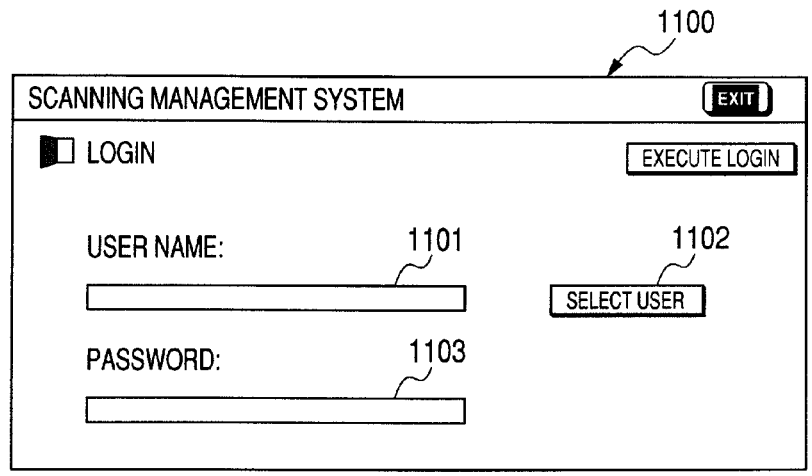
FIG. 11 is a diagram illustrating an example of a login screen.

In Step S502, the multifunction device 210 performs a process to login the scanning management system 220 according to an operation of the operator. An example of a login screen 1100 displayed on the display device of the multifunction device 210 will be described with reference to FIG. 11. The operation control module 213 displays a user name field 1101 and a password field 1103 on the login screen 1100 to prompt the operator to input his/her user name and password. When the operator selects a user selection button 1102 during the input of the user name, the user names registered may be displayed such that the operator can select his/her user name. The operator may log in, for example, the multifunction device 210 or the business data management system 230 in addition to the scanning management system 220. Also, the operator may use a single-sign-on technique to log in plural systems, such as the multifunction device 210 and the scanning management system 220.

Figure 12:
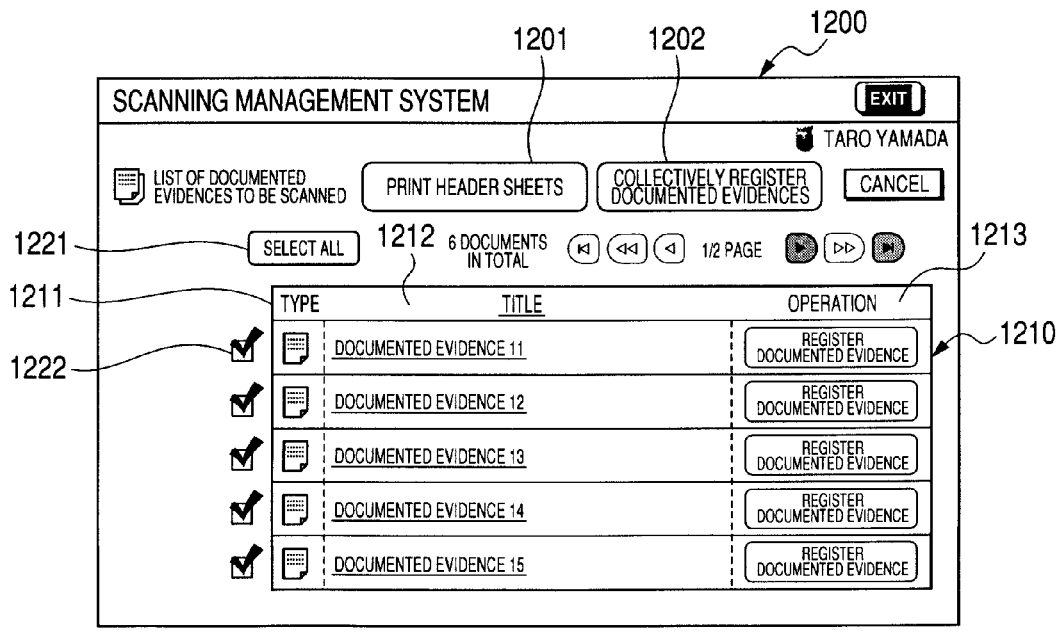
FIG. 12 is a diagram illustrating an example of a documented-evidence list screen.

In Step S504, the multifunction device 210 acquires a list of documented evidences which are to be scanned and which are allocated to the operator who has logged in Step S502, from the scanning management system 220. The document list generating module 221 of the scanning management system 220 uses the operator ID of the operator who has logged in to generate the list of documented evidences, which are allocated to the operator ID. The user interface module 2201 of the scanning management system 220 receives the list of documented evidences generated by the document list generating module 221, and displays the received list on the display device of the multifunction device 210. Next, an example of a documented-evidence list screen 1200 displayed on the display device of the multifunction device 210 will be described with reference to FIG. 12.

A documented-evidence list table 1210 having a type column 1211, a title column 1212, and an operation column 1213 is displayed on the documented-evidence list screen 1200. A type of each document is described in the type column 1211, a title of each documented evidence to be scanned is described in the title column 1212, and an operation to be performed for each document is described in the operation column 1213. Also, each document has a check box 1222 such that each document is selected in accordance with an operation of the operator. Furthermore, when the operator selects an 'all selection' button 1221, all the documents are selected, and check marks are displayed in the check boxes 1222.

In addition to the documented evidence list 1210, a header sheet print button 1201 and a collective evidence registration button 1202 are displayed on the screen.

When the screen is changed to the documented-evidence list screen 1200 again, the documented evidences which have already been registered may not be displayed on the documented evidence list 1210. The document list generating module 221 inquires of the document management system 240 as to whether each documented evidence has already been registered.

In Step S506, it is determined what operation the operation performs on the documented-evidence list screen 1200. That is, when the header sheet print button 1201 is selected, the process proceeds to Step S508. When the collective evidence registration button 1202 is selected, the process proceeds to Step S510. When any documented-evidence registering button in the operation column 1213 is selected, the process proceeds to Step S512. When an EXIT button is selected, the process proceeds to Step S514, and the process ends.

In general, the operator sequentially selects the header sheet print button 1201 and the collective evidence registration button 1202. The operator selects any one of the registration buttons in the operation column 1213, if necessary. That is, the operator selects the header sheet print button 1201 to print the header sheet. Then, the operator collects documented evidences based on, for example, the title of the documented evidences printed on the header sheet (information about a pair of an attribute name and an attribute value). The operator overlaps the header sheet and the documented evidence described in the header sheet in order, and scans them using the multifunction device 210. When all the documents are registered, the process ends. However, when the documented evidence described in the header sheet is not matched with the scanned documented evidence, it is necessary to scan the documented evidence again. In this case, any one of the documented-evidence registering buttons in the operation column 1213 is selected.

After Step S508, Step S510, and Step S512, the process returns to the Step S504.

Figure 6:
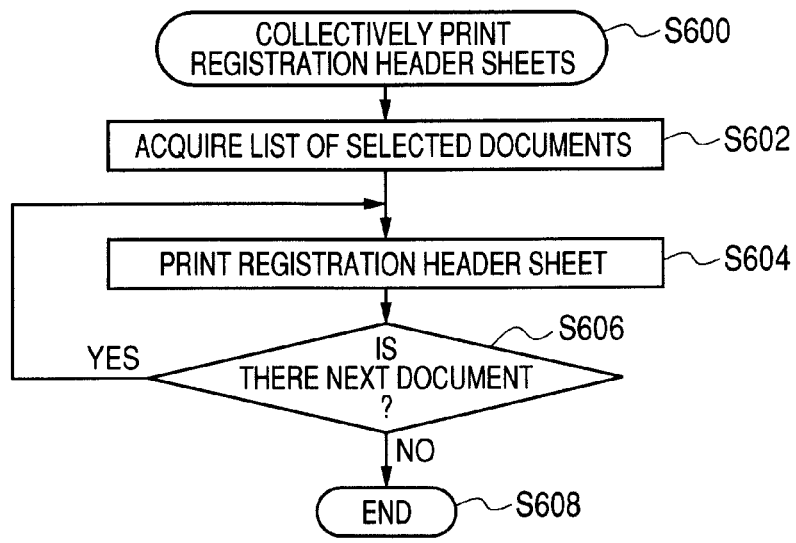
FIG. 6 is a flow chart illustrating an example of a process of collectively printing registration header sheets.
Figure 7:
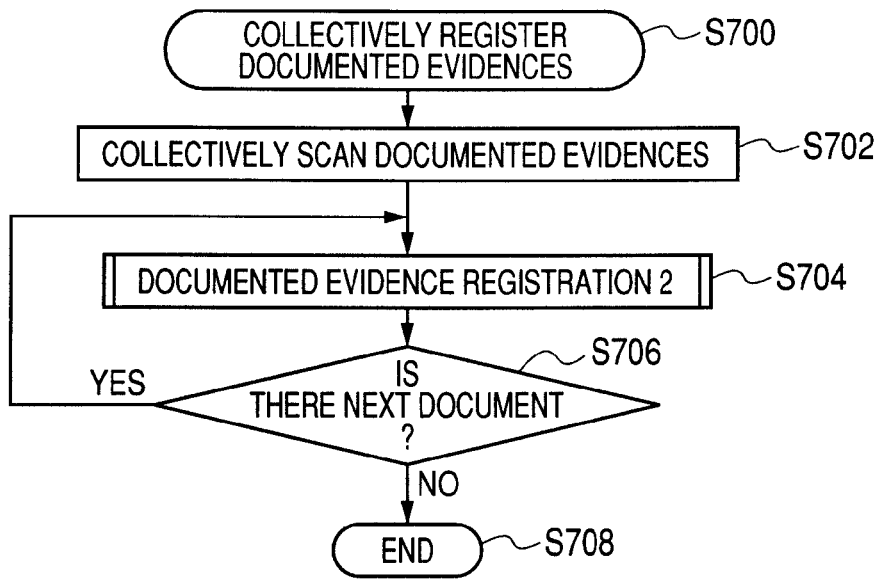
FIG. 7 is a flow chart illustrating an example of a process of collectively registering documented evidences.

Step S508 will be described with reference to a flow chart shown in FIG. 6, Step S510 will be described with reference to a flow chart shown in FIG. 7, and Step S512 will be described with reference to a flow chart shown in FIG. 9.

Next, a process of collectively printing the registration header sheets (Step S508) will be described with reference to the flow chart shown in FIG. 6.

In Step S602, the operation control module 213 acquires a list of documents (specifically, a list of document IDs) corresponding to check fields 1222 in the documented-evidence list screen 1200 which are selected by the operator. Then, the operation control module 213 transmits the list of documents to the document list generating module 221 of the scanning management system 220 through the communication module 214, the communication line 299, and the communication module 227. The document list generating module 221 requests the business data management system 230 to transmit information of pairs of attribute names and attribute values, based on the document IDs in the list of the documents.

The business data control module 232 of the business data management system 230 receives the request from the document list generating module 221 through the communication module 227, the communication line 299, and the communication module 233, and searches the business data storage module 231 for information of pairs of attribute names and attribute values corresponding to the document IDs. The business data storage module 231 stores, for example, a document management information table 1000 shown in FIG. 10. That is, the document management information table 1000 includes a document ID column 1001, a document name column 1002, a registration location column 1003, an attribute name column 1004, an attribute value column 1005, an attribute name column 1006, and an attribute value column 1007. The document ID column 1001 stores a document ID, the document name column 1002 stores a document name, and the registration location column 1003 stores a location where an image of a document is to be registered (or a location where the image of a document is registered). Also, an attribute name and an attribute value to be written on a header sheet are stored in the attribute name column 1004 and the attribute value column 1005 (the attribute name column 1006 and the attribute value column 1007 and the like), respectively. The attribute name and the attribute value are information to be written on the documented evidence. The business data control module 232 transmits the information to the document list generating module 221 through the communication module 233, the communication line 299, and the communication module 227. The document list generating module 221 transmits the received information to the operation control module 213 of the multifunction device 210 through the communication module 227, the communication line 299, and the communication module 214.

In Step S604, the operation control module 213 generates an image to print, a header sheet, the received information of the pair of the attribute name and the attribute value. Then, the image output module 211 prints the generated image.

Figure 14:
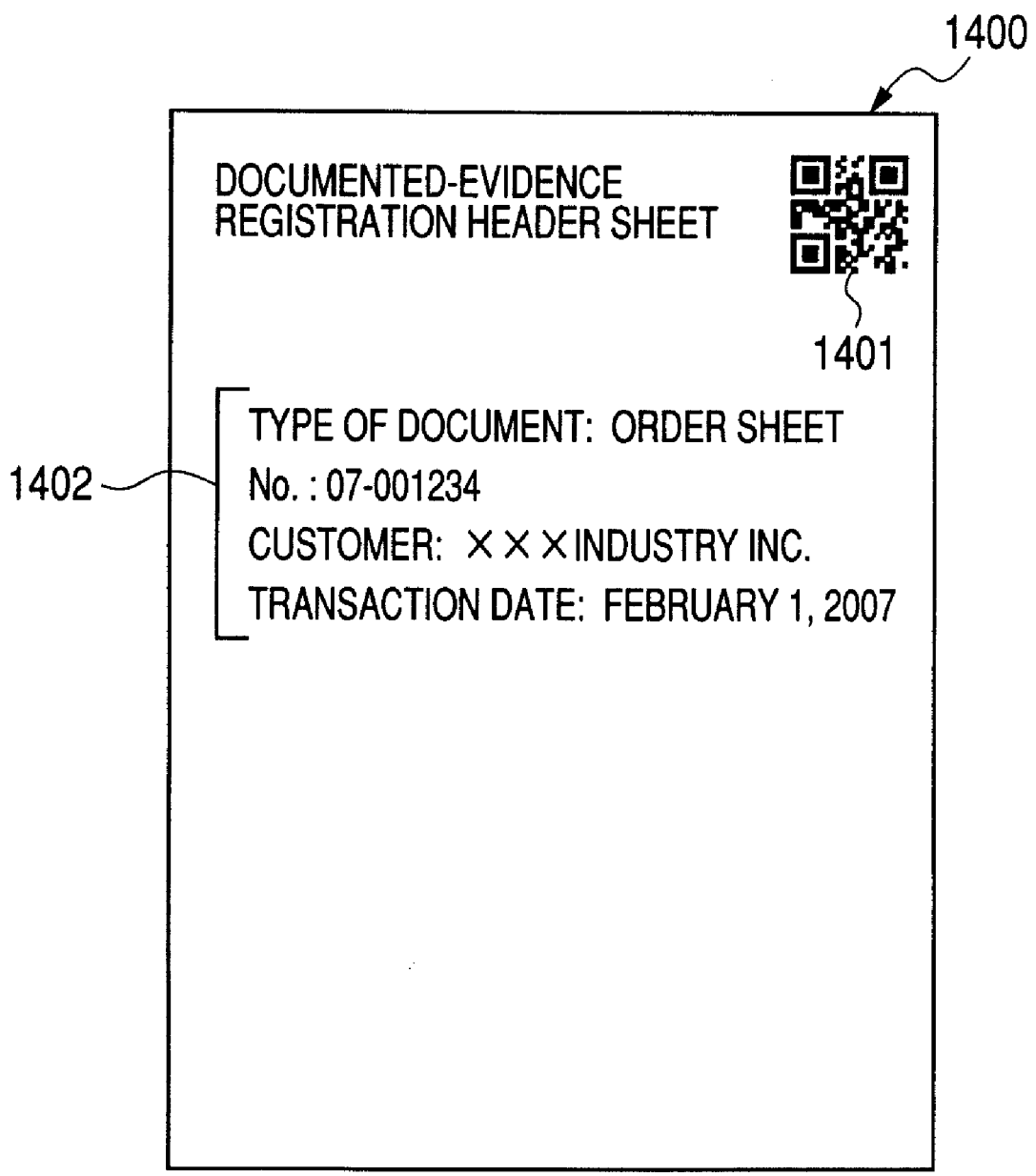
FIG. 14 is a diagram illustrating an example of a documented-evidence registration header sheet.

An example of the printed header sheet will now be described with reference to FIG. 14. The image output module 211 prints a documented-evidence registration header sheet 1400 having a QR code 1401 and an attribute-name/attribute-value field 1402.

The information of the pair of the attribute name and the attribute value, which is received by the operation control module 213, is embedded as a code with the QR code 1401. Specifically, for example, the QR code 1401 includes a value indicating a header sheet, an operator ID of an operator who should register a documented evidence, an operator ID of an operator who output the header sheet, an attribute name of the documented evidence, an attribute value of the documented evidence, and a storage location in the storage module 231 of the business data management system 230. The QR code 1401 may include the attribute value, but may not include the attribute name.

The attribute-name/attribute-value field 1402 has the information of the pair of the attribute name and the attribute value in a form of characters or the like. Specifically, for example, information of a pair of (i) a 'type of document', which is an example of an 'attribute name', and (ii) an 'order sheet', which is an 'attribute value'; information of a pair of 'No.' and '07-001234'; information of a pair of an 'customer' and an 'XXX Industry, Inc.'; and information of a pair of a 'transaction date' and 'Feb. 1, 2007' are printed.

When the information of the pair of the attribute name and the attribute value or the information of the attribute value is embedded with information represented by the QR code 1401, the QR code 1401 includes information described in the attribute-name/attribute-value field 1402 (including the case in which the information is identical). Also, the QR code 1401 may include the storage location of the information of the pair of the attribute name and the attribute value in the business data storage module 231. Of course, in this case, information represented by the QR code 1401 is different from information described in the attribute-name/attribute-value field 1402. Only the attribute-name/attribute-value field 1402, not the QR code 1401, may be printed.

In Step S606, it is determined as to whether a header sheet to be printed remains. If it is determined that there remains a heater sheet to be printed, the process returns to Step S604. If it is determined that all the header sheets are printed, the process proceeds to Step S608, and the process ends.

Next, a process of collectively registering the documented evidences (Step S510) will be described with reference to the flow chart shown in FIG. 7. In this process, the operator has prepared sets of header sheets and documented evidences to be scanned.

In Step S702, the image receiving module 212 of the multifunction device 210 continuously scans the sets of header sheets and documented evidences prepared by the operator, using the auto document feeder of the multifunction device 210.

Figure 13:
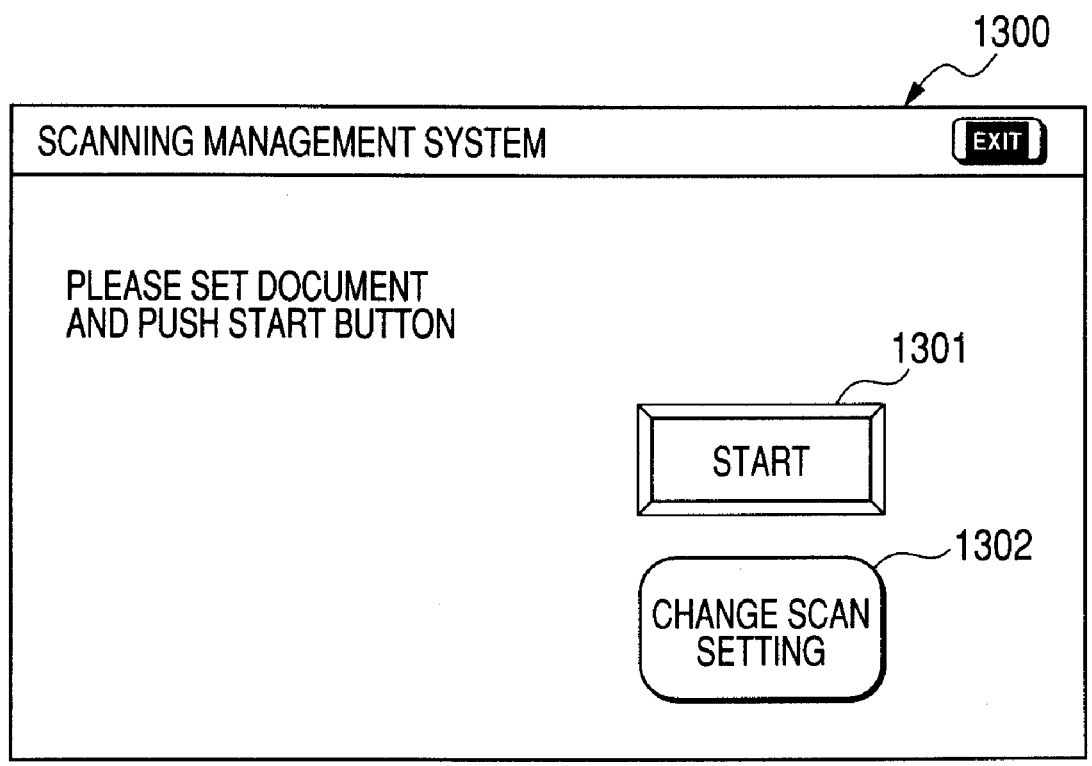
FIG. 13 is a diagram illustrating an example of a scan start screen.

A scan start screen 1300 displayed on the display device of the multifunction device 210 will now be described with reference to FIG. 13. The operation control module 213 displays a start button 1301 and a scan setting change button 1302 on the scan start screen 1300. When the operator selects the start button 1301, the operation control module 213 continuously scans the documents placed on the auto document feeder. When the scan setting change button 1302 is selected, the operation control module 213 determines as to how to read documents (whether images to be scanned include color images or only black-and-white images). Also, the login screen 1100 may be directly changed to this scan start screen 1300.

The scanned image is transmitted to the code analyzing module 222 or the character recognizing module 223 through the communication module 214, the communication line 299, and the communication module 227. The communication module 227 determines as to whether the scanned image is transmitted to the code analyzing module 222 or the character recognizing module 223, according to whether or not the image includes a QR code. If the image includes the QR code, the communication module 227 transmits the scanned image to the code analyzing module 222. On the other hand, if the image does not include the QR code, the communication module 227 transmits the scanned image to the character recognizing module 223. If no QR code is printed on the header sheet, the character recognizing module 223 of the scanning management system 220 may perform character recognition for the scanned image to determine as to whether there are characters 'header sheet' in the image. Then, the character recognizing module 223 may determine as to whether or not the scanned image is the header sheet, based on the result of the character recognition.

Step S704 registers the scanned document. The details thereof will be described with reference to the flow chart shown in FIG. 8 later.

In Step S706, it is determined as to whether or not documents to be scanned remain. If it is determined that there remains a document to be scanned, the process returns to Step S704. If all the documents are scanned, the process proceeds to Step S708, and the process ends.

A documented evidence registering process (Step S704) in the collective evidence registration will now be described with reference to the flow chart shown in FIG. 8.

In Step S802, the code analyzing module 222 of the scanning management system 220 analyzes the QR code printed on the header sheet. That is, the code analyzing module 222 extracts information embedded in the QR code. When no QR code is printed on the header sheet, character recognition may be performed for a pair of an attribute name and an attribute value written on the header sheet.

In Step S804, the character recognizing module 223 of the scanning management system 220 performs the character recognition for the documented evidence. That is, the character recognizing module 223 converts characters written on the documented evidence into code information.

Next, an example of the documented evidence to be subjected to the character recognition will be described using an order sheet 1500 shown in FIG. 15. The order sheet 1500 includes a document-type field 1501, a transaction date field 1502, a number field 1503, and a customer field 1504. The character recognizing module 223 analyzes the order sheet 1500 to extract areas of the document-type field 1501, the transaction date field 1502, the number field 1503, the customer field 1504 and the like, and recognizes characters written in the extracted areas. That is, the character recognizing module 223 recognizes 'order sheet' from the document-type field 1501, 'Feb. 1, 2007' from the transaction date field 1502, and 'No. 07-001234' from the number field 1503, and 'XXX Industry Inc.' from the customer field 1504, respectively, and extracts the recognized characters as codes.

In Step S806, the registration module 225 (the image determining module 2221 in FIG. 4) of the scanning management system 220 receives the process results in Steps S802 and S804, and determines as to whether or not the scanned documented evidence is the corresponding documented evidence. The criterion information 2225 may be used to determine as to whether the scanned documented evidence is the corresponding documented evidence. For example, the determination is made (i) according to user condition (whether or not an operator ID of an operator who has logged in is matched with the operator ID included in the QR code) and (ii) according to whether or not the attribute included in the QR code (a pair of an attribute name and an attribute value) is matched with the attribute of the result of the character recognition of the scanned documented evidence. Also, in the case where the QR code includes the attribute value, but does not include the attribute name, the determination may be made according to whether or not the attribute value included in the QR code is matched with the attribute value of the result of the character recognition of the scanned documented evidence. Furthermore, when the storage location of the information of the pair of the attribute name and the attribute value in the business data storage module 231 is embedded with the QR code, the information of the pair of the attribute name and the attribute value may be read from the storage location (only the attribute value may be read) and then used to make the above determination.

When the scanned document is contaminated or a character string is stained with ink, the character recognizing module 223 may erroneously recognize the scanned document, or it may not recognize the scanned document. Also, it may be difficult for the character recognizing module 223 to discriminate '–' (a minus symbol of half-width character), '–' (a prolonged-sound symbol in Japanese language), and '–' (a minus symbol of full-width character). For this reason, the criterion information 2225 is used to determine correct documented evidence according to the degree of matching between the attribute value included in the QR code and a character string extracted from the scanned documented evidence by the character recognizing module 223.

Next, criteria (use to determine as to whether or not the scanned documented evidence is the corresponding documented evidence) in the criterion information 2225 will be described with reference to FIGS. 17 and 18.

A table shown in FIG. 17 is an example of the criterion information. The table includes an item column and a value column. For example, if the item is 'user condition' and if the value is 'specified' (it is assumed that the value takes either 'specified' or 'unspecified'), this means that the operator ID embedded with the QR code of the registration header sheet needs to be matched with an operator ID of an operator who has logged in. Also, if the item is 'user condition' and if the value is 'unspecified', this means that the operator ID is not considered. That is, this means that the matching between the operator IDs is not used as a criterion. Also, it is assumed that when the item is a 'character recognition range', the value takes either 'first page', 'all pages', or an 'area designation'. If the item is the 'character recognition range', the character recognizing module 223 can designate an area to be subjected to the character recognition according to the value. The 'area designation' is used to perform the character recognition for an area that is designated in advance. Furthermore, it is assumed that when the item is 'attribute matching conditions', the value indicates the 'number of items'. If the item is 'attribute matching conditions', this means that 'it is determined that a documented evidence is correct, if attributes of indispensable items are matched and if the number of matched attributes of optional items are equal to or larger than number designated by the value'.

A table shown in FIG. 18 is an example of the criterion information for each attribute. The table includes an attribute name column, a level column, and a condition column. For example, when the 'type of document', 'indispensable', and 'complete matching' are written in the attribute name column, the level column, and the condition column, respectively, this means that 'it is necessary that the type of document embedded with the QR code of the registration header sheet be completely matched with the type of document in the result of the character recognition'. Also, when 'No.', 'indispensable', and 'complete matching after converting into a half-width character' are written in the attribute name column, the level column, and the condition column, respectively, this means that 'it is necessary that No. embedded with the QR code of the registration header sheet and alphanumeric characters, which are contained in the result of the character recognition and have been converted into half-width characters, be completely matched with each other'. Furthermore, when a 'customer', 'option', and 'the top three characters are matched' are written in the attribute name column, the level column, and the condition column, respectively, this means that 'it is necessary that the top three characters of the customer embedded with the QR code of the registration header sheet be completely matched with the top three characters in the customer of the result of the character recognition. However, this is limited to the case in which the attribute name of the customer exists'. Furthermore, when a 'transaction date', 'option', and 'converting into A.D. and complete matching' are written in the attribute name column, the level column, and the condition column, respectively, this means that 'it is necessary that the transaction date embedded with the QR code of the registration header sheet and the transaction date, which is contained in the result of the character recognition and which has been converted into A.D., be completely matched with each other. However, this is limited to the case in which the attribute name of the transaction date exists'. As described above, not only mere matching between characters but also matching between characters in those meaning may be verified by converting objects to be compared. Also, the attributes may be classified into (i) ones that have to be verified and (ii) the others that are optional to be verified, in accordance with levels of the respective attributes so as to form criteria.

When the scanned documented evidence is the corresponding documented evidence (that is, when the documented evidence written on the header sheet is scanned), the process proceeds to Step S808. Otherwise (that is, typically, when a documented evidence different from one written on the header sheet is scanned), the process proceeds to Step S812.

In Step S808, the determining module 224 of the scanning management system 220 transmits the image of the documented evidence to the document management system 240. The document management module 242 of the document management system 240 receives the image of the documented evidence from the determining module 224 through the communication module 227, the communication line 299, and the communication module 243. The document management module 242 stores the received image in the document image storage module 241. Then, the document management module 242 sends back information of the storage location of the image to the determining module 224 of the scanning management system 220.

In Step S810, the determining module 224 of the scanning management system 220 sends back the information of the storage location of the documented evidence in the document image storage module 241 to the business data management system 230. The business data control module 232 of the business data management system 230 stores the storage location of the image of the documented evidence in the business data storage module 231.

In Step S812, the header reprint control module 226 creates an image of a header sheet of a documented evidence to be registered again, and performs control so that the multifunction device 210 prints the header sheet.

Next, an example of the header sheet to be registered again will be described using a documented-evidence re-registration header sheet 1600 shown in FIG. 16. The documented-evidence re-registration header sheet 1600 will be described in comparison with the documented-evidence registration header sheet 1400 shown in FIG. 14.

A QR code 1601, an attribute-name/attribute-value field 1602, a check field 1603, and a message field 1604 are printed on the documented-evidence re-registration header sheet 1600. The QR code 1601 and the attribute-name/attribute-value field 1602 are similar to the QR code 1401 and the attribute-name/attribute-value field 1402 of the documented-evidence registration header sheet 1400, respectively.

Portions where the process result by the code analyzing module 222 is not matched with the process result by the character recognizing module 223 are written in the message field 1604. For example, a message 'the types of documents are not matched with each other. Please register the document again' is written in the message field 1604. The message allows the operator to know check points of the documented evidence.

A sentence 'Please mark a left check box if you determine that the documented evidence to be registered is correct one' and a check box are printed on the check field 1603. The character recognizing module 223 cannot ensure a character recognition rate of 100% at all times. Therefore, even if the operator appropriately scans the documented evidence, the scanned image may be determined as incorrect documented evidence according to the result of the character recognition of the recognizing module 223 or the criteria of the determining module 224. In this case, a check box which will be used to indicate that the documented evidence is correct one is printed. The code analyzing module 222 may analyze the check box and transmit the analysis result to the determining module 224. When the check box is marked, the determining module 224 determines to register the image of the documented evidence regardless of the result of the character recognition of the character recognizing module 223.

Next, an example of a process of registering individual documented evidence (Step S512) will be described with reference to the flow chart shown in FIG. 9. This process is performed to register individual documented evidence when the operator selects an evidence registration button in the operation column 1213 of the documented-evidence list screen 1200.

In Step S902, the determining module 224 of the scanning management system 220 receives the document that is selected on the documented-evidence list screen 1200 by the operator, from the operation control module 213 of the multifunction device 210. Also, the determining module 224 receives information of a pair of an attribute name and an attribute value of the selected document from the business data management system 230. The code analyzing module 222 may analyze a QR code of the header sheet to acquire the information of the pair of the attribute name and the attribute value.

Figure 8:
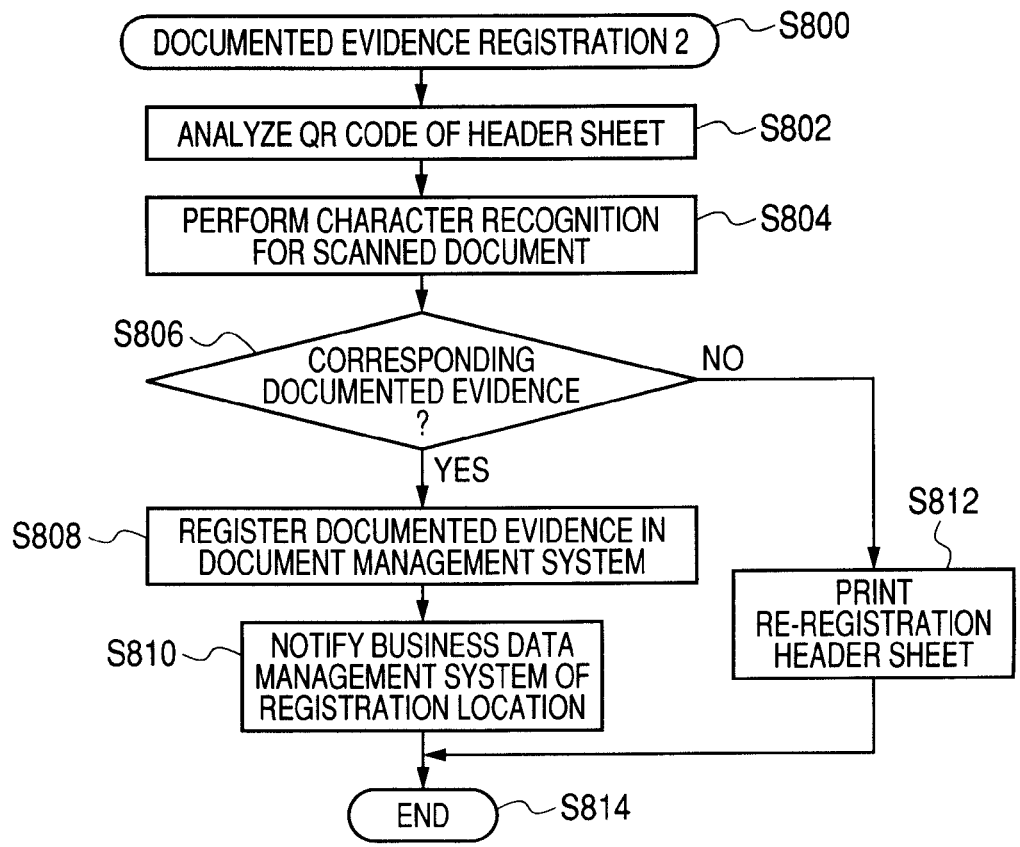
FIG. 8 is a flow chart illustrating an example of a documented-evidence registering process in the collective documented-evidence registration.

The processes from Step S904 to Step S910 are similar to those from Step S804 to Step S810 shown in FIG. 8.

In Step S912, the determining module 224 transmits an error message to the operation control module 213 of the multifunction device 210 such that the multifunction device 210 displays on the display device that the scanned image is not the corresponding documented evidence. Similar to the message field 1604 of the documented-evidence re-registration header sheet 1600, the error message may include portions where the processed result by the code analyzing module 222 is not matched with the processed result by the character recognizing module 223. Then, the operation control module 213 displays the error message on the display device of the multifunction device 210.

Figure 19:
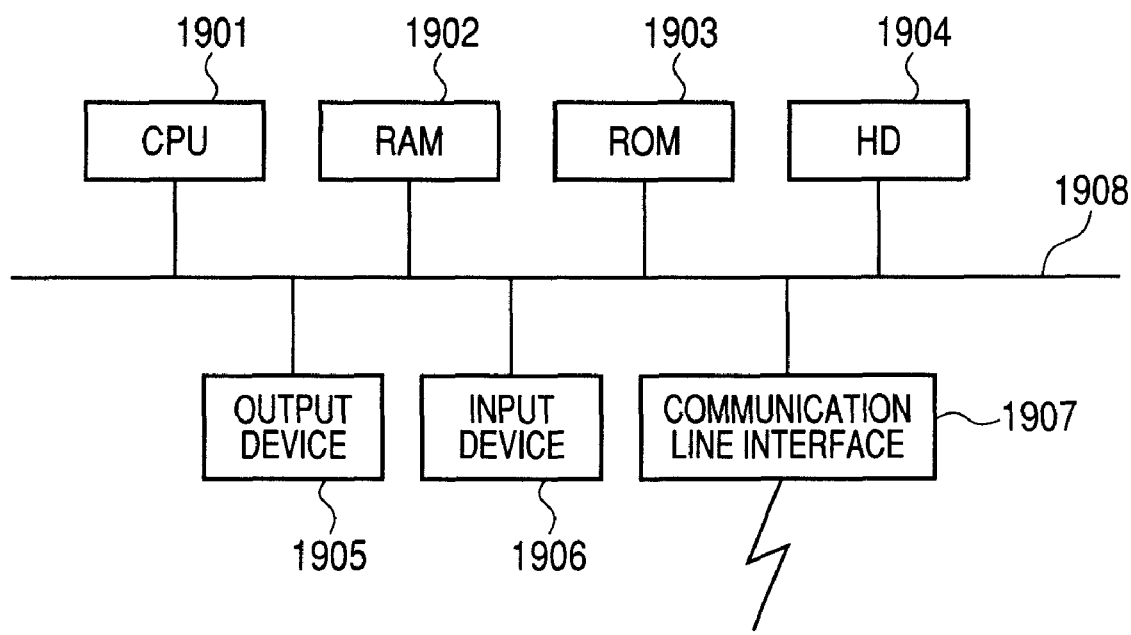
FIG. 19 is a block diagram illustrating an example of the hardware configuration of a computer that realizes the exemplary embodiments of the invention.

A program according to this exemplary embodiment is executed by a computer having a general hardware configuration shown in FIG. 19, such as a personal computer or a server computer. The computer includes: a CPU 1901 that executes programs of the document list generating module 221, the code analyzing module 222, the character recognizing module 223, the determining module 224, the operation control module 213, business data control module 232, and the document management module 242; a RAM 1902 that stores the programs and data; a ROM 1903 that stores programs for starting the computer; an HD 1904, which is a secondary memory unit (for example, a hard disk may be used); an input device 1906, such as a mouse or a keyboard, that inputs data; an output device 1905, such as a CRT or a liquid crystal display; a communication line interface 1907 (for example, a network interface card may be used) for connection to a communication network; and a bus 1908 that connects these components to perform data exchange. A plurality of computers may be connected to one another through a network.

The above-described embodiment is achieved in cooperation with software and a hardware resource by making a system having the above-mentioned hardware configuration read a computer program, which is software.

The hardware configuration shown in FIG. 19 is just an illustrative example, but this exemplary embodiment is not limited to the hardware configuration shown in FIG. 19. Any hardware configuration can be used as long as it can execute the modules described in this exemplary embodiment. For example, some modules may be formed of dedicated hardware components (for example, ASIC), and some modules may be provided in an external system and then connected to the hardware configuration by a communication line. In addition, a plurality of systems shown in FIG. 19 may be connected to one another by a communication line so as to cooperatively operate. This exemplary embodiment may be incorporated into, for example, an information apparatus, a copying machine, a facsimile, a scanner, a printer, and a multifunction device, in addition to the personal computer.

In the above-described embodiment, the character recognizing module 105 performs a character recognizing process, but the invention is not limited thereto. For example, the character recognizing module 105 may be configured to analyze the structure of an image in order to improve a character recognition rate (for example, a process of specifying a character string of a title).

Figure 9:
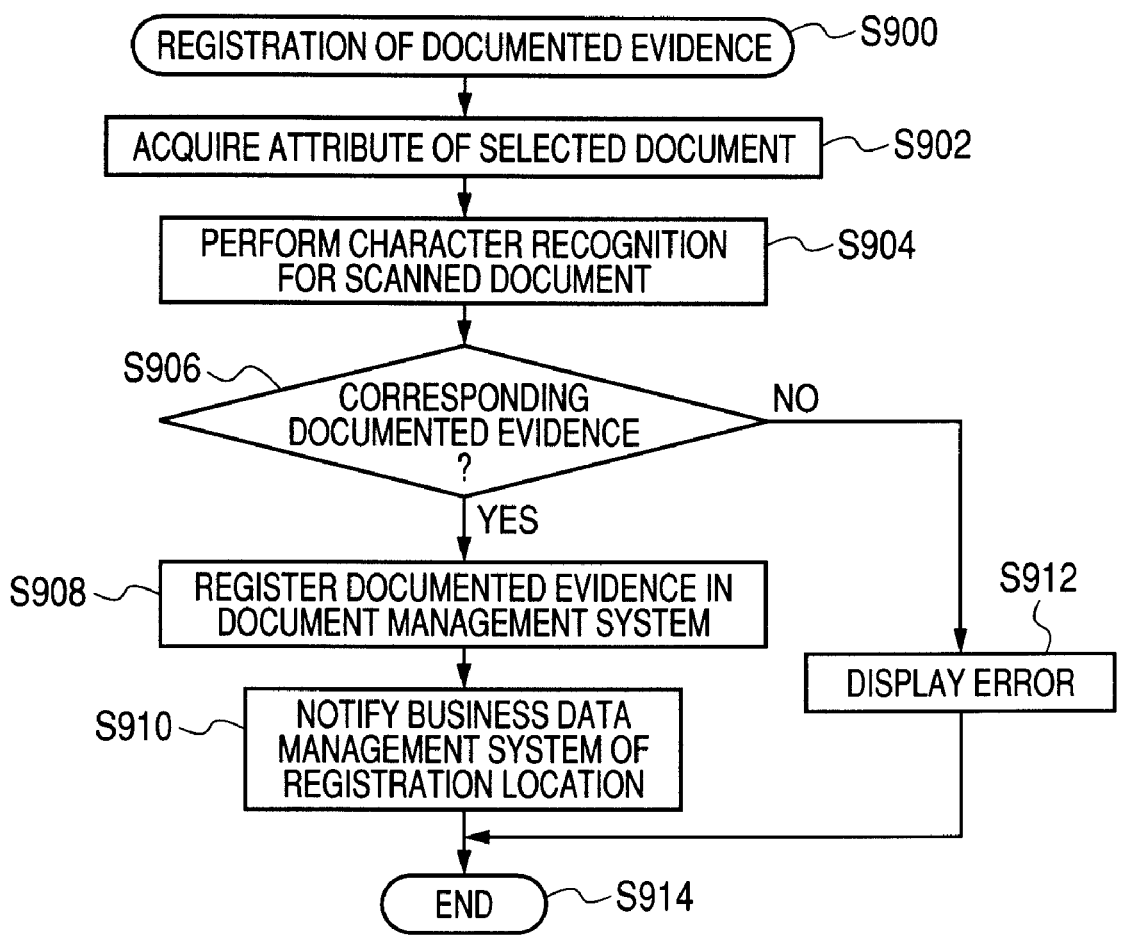
FIG. 9 is a flow chart illustrating an example of a process of registering individual documented evidences.

Further, in Step S812 of the flow chart shown in FIG. 8 or Step S912 of the flow chart shown in FIG. 9, when it is determined that the scanned documented evidence is not matched with the attribute of the header sheet, an email may be used to notify the operator of the fact. Alternatively, the documented evidence may be designated again and scanned, without using the header sheet.

Furthermore, the above-described program may be stored in a recording medium. Alternatively, the program may be provided through a communication device. In this case, for example, the invention can be applied to a 'computer readable recording medium including the program'.

The term 'computer readable recording medium including the program' means a computer readable recoding medium having the program stored therein that is used to install, execute, and deliver the program.

For example, the recording medium is a digital versatile disc (DVD), and includes a DVD-R, a DVD-RW, and a DVD-RAM that are approved by the DVD forum, DVD+RW formats, such as a DVD+R and a DVD+RW, compact discs, such as a CD-ROM (compact disc read only memory), a CD-R (compact disc-recordable), and a CD-RW (compact disc rewritable), a magneto-optical disc (MO), a flexible disc (FD), a magnetic tape, a hard disc, a read only memory (ROM), an electrically erasable and programmable read only memory (EEPROM), a flash memory, and a random access memory (RAM).

The program or a portion of the program may be stored in the recording medium to be preserved or delivered. Alternatively, the program may be transmitted through a transmission medium, such as a wire network used for a LAN (local area network), a MAN (metropolitan area network), a WAN (wide area network), Internet, Intranet, and Extranet, a wireless communication network, or a combination thereof, or it may be transmitted through a carrier wave.

Further, the program may be a portion of another program, or it may be separately stored from other programs in a recoding medium. In addition, the program may be separately stored in a plurality of recording media. Further, the program may be stored in a recording medium in any encoded or compressed format as long as it can be decoded or decompressed.

What is claimed is:

1. A non-transitory computer-readable medium storing an information processing program that causes a computer to execute information processing, the information processing comprising:
   printing a first image to a first document, the first image comprising a first character and a code image, wherein the first character indicates at least part of a first pair of a first attribute name and a first attribute value included in electronic data, and the code image comprises:
      (i) a first information image that indicates the at least part of the first pair of the first attribute name and the first attribute value included in the electronic data, and
      (ii) a second information image that indicates a storage location of the electronic data;
   scanning the first document and a paper document in series to obtain the first image and a second image of the paper document, the second image of the paper document comprising a second character that indicates at least part of a second pair of a second attribute name and a second attribute value;
   determining whether the at least part of the first pair of the first attribute name and the first attribute value matches the at least part of the second pair of the second attribute name and the second attribute value;
   registering the second image of the paper document to the storage location in response to determining that the at least part of the first pair of the first attribute name and the first attribute value matches the at least part of the second pair of the second attribute name and the second attribute value; and
   prohibiting registering of the second image of the paper document to the storage location in response to determining that the at least part of the first pair of the first attribute name and the first attribute value does not match the at least part of the second pair of the second attribute name and the second attribute value.

2. The non-transitory computer-readable medium according to claim 1, wherein the information processing further comprises storing the electronic data including the first attribute name and the first attribute value, and
   wherein the first image comprises:
      the first character that indicates the at least part of the first pair of the first attribute name and the first attribute value included in the stored electronic data, and the code image comprises:
      (i) the first information image that indicates the at least part of the first pair of the first attribute name and the first attribute value included in the stored electronic data, and
      (ii) the second information image that indicates the storage location of the stored electronic data.

3. The non-transitory computer-readable medium according to claim 1, wherein the code image comprises a first operator identifier that identifies a first operator who should register the paper document,
   wherein the determining comprises comparing the first operator identifier included in the code image with a second operator identifier of a second operator who is registering the second image of the paper document, and
   wherein the registering comprises registering the second image of the paper document in response to determining that the at least part of the first pair of the first attribute name and the first attribute value matches the at least part of the second pair of the second attribute name and the second attribute value and that the first operator identifier matches the second operator identifier.

4. The non-transitory computer-readable medium according to claim 1, wherein the prohibiting further comprises:
   outputting a third image to a second document, the third image of the second document comprising (i) the code image printed to the first document and (ii) information that indicates the second image of the paper document is not registered.

5. The non-transitory computer-readable medium according to claim 1, wherein the first image further comprises information that indicates whether an operator has determined that the paper document is correct,
   wherein the determining comprises determining whether the information indicates the operator has determined that the paper document is correct, and
   wherein the registering comprises registering the second image of the paper document in response to determining that the at least part of the first pair of the first attribute name and the first attribute value matches the at least part of the second pair of the second attribute name and the second attribute value and determining that the information indicates the operator has determined the paper document is correct.

6. A non-transitory computer-readable medium storing an information processing program that causes a computer to execute information processing, the information processing comprising:
   receiving:
      (i) a first image of a first document, the first image of the first document comprising a first character and a code image, wherein the first character indicates at least part of a first pair of a first attribute name and a first attribute value included in electronic data, and the code image comprises:
         (a) a first information image that indicates the at least part of the first pair of the first attribute name and the first attribute value included in the electronic data, and
         (b) a second information image that indicates a storage location of the electronic data, and
      (ii) a second image of a paper document, the second image of the paper document comprising a second character that indicates at least part of a second pair of a second attribute name and a second attribute value;
   determining whether the at least part of the first pair of the first attribute name and the first attribute value matches the at least part of the second pair of the second attribute name and the second attribute value;
   transmitting the second image of the paper document in response to determining that the at least part of the first pair of the first attribute name and the first attribute value matches the at least part of the second pair of the second attribute name and the second attribute value, and
   storing the transmitted second image of the paper document.

7. The non-transitory computer-readable medium according to claim 6, wherein the first document further comprises a first operator identifier that identifies a first operator who should transmit the second image of the paper document,
   wherein the determining comprises comparing the first operator identifier included in the second image with a second operator identifier of a second operator who is transmitting the second image of the paper document, and wherein the transmitting comprises transmitting the second image of the paper document in response to determining that the at least part of the first pair of the first attribute name and the first attribute value matches the at least part of the second pair of the second attribute name and the second attribute value and that the first operator identifier matches the second operator identifier.

8. The non-transitory computer-readable medium according to claim 6, wherein the information processing further comprises:

prohibiting transmitting of the second image of the paper document in response to determining that the at least part of the first pair of the first attribute name and the first attribute value does not match the at least part of the second pair of the second attribute name and the second attribute value and requesting to output a third image to a second document, the third image of the second document comprising (i) the received code image and (ii) information that indicates that the second image of the paper document is not transmitted.

9. The non-transitory computer-readable medium according to claim 6, wherein the first image of the first document image further comprises information that indicates whether an operator has determined that the paper document is correct, wherein the determining comprises determining whether the information indicates the operator has determined that the paper document is correct, and wherein the transmitting comprises transmitting the second image of the paper document in response to determining that the at least part of the first pair of the first attribute name and the second attribute value matches the at least part of the second pair of the second attribute name and the second attribute value and determining that the information indicates the operator has determined the paper document is correct.

10. A non-transitory computer-readable medium storing an information processing program that causes a computer to execute information processing, the information processing comprising:

receiving:
(1) a first image of a first document, the first image of the first document comprising a first character and a code image, wherein the first character indicates at least part of a first pair of a first attribute name and a first attribute value included in electronic data, and the code image comprises:
(i) a first information image that indicates the at least part of the first pair of the first attribute name and the first attribute value included in the electronic data, in a form different from a form of the first character, and
(ii) a second information image that indicates a storage location of the electronic data in the form different from the form of the first character, and
(2) a second image of a paper document, the second image of the paper document comprising a second character that indicates at least part of a second pair of a second attribute name and a second attribute value;

determining whether the at least part of the first pair of the first attribute name and the first attribute value matches the at least part of the second pair of the second attribute name and the second attribute value; and printing the second image of the paper document in response to determining that the at least part of the first pair of the first attribute name and the first attribute value matches the at least part of the second pair of the second attribute name and the second attribute value.

11. The non-transitory computer-readable medium according to claim 10, wherein the information processing further comprises prohibiting printing the second image of the paper document in response to determining that the at least part of the first pair of the first attribute name and the first attribute value does not match the at least part of the second pair of the second attribute name and the second attribute value.

12. The non-transitory computer-readable medium according to claim 10, wherein the first image of the first document image comprises a first operator identifier that identifies a first operator who should register the second image of the paper document, wherein the determining comprises comparing the first operator identifier included in the first image of the first document with a second operator identifier of a second operator who is outputting the second image of the paper document, and wherein printing comprises printing the second image of the paper document in response in response to determining that the at least part of the first pair of the first attribute name and the first attribute value matches the at least part of the second pair of the second attribute name and the second attribute value and that the first operator identifier matches the second operator identifier.

13. The non-transitory computer-readable medium according to claim 10, wherein the information processing further comprises:

prohibiting printing of the second image of the paper document in response to determining that the at least part of the first pair of the first attribute name and the first attribute value does not match the at least part of the second pair of the second attribute name and the second attribute value and requesting to output a third image to a second document, the third image of the second document comprising (i) at least one of the first information image and the second information image and (ii) information indicating that the second image of the paper document is not output.

14. The non-transitory computer-readable medium according to claim 10, wherein the first image of the first document comprises information that indicates whether an operator has determined that the paper document is correct, wherein the determining comprises determining whether the information indicates the operator has determined that the paper document is correct, and wherein the printing comprises printing the second image of the paper document in response to determining that the at least part of the first pair of the first attribute name and the first attribute value matches the at least part of the second pair of the second attribute name and the second attribute value and determining that the information indicates the operator has determined the paper document is correct.

15. An information processing system comprising:

an image output unit that prints an initial image to a document, the initial image comprising:
a first image that includes a first character that indicates at least part of a first pair of a first attribute name and a first attribute value included in electronic data, and a code image, the code image comprising:

(i) a first information image that indicates the at least part of the first pair of the first attribute name and the first attribute value included in the electronic data, and (ii) a second information image that indicates a storage location of the electronic data;

an image reception unit that scans the document printed by the image output unit and a paper document to obtain the first image and a second image of the paper document, the second image of the paper document comprising a second character that indicates at least part of a second pair of a second attribute name and a second attribute value;

a determination unit that determines whether the at least part of the first pair of the first attribute name and the first attribute value matches the at least part of the second pair of the second attribute name and the second attribute value; and a registration unit that registers the second image of the paper document to the storage location in response to the determination unit determining that the at least part of the first pair of the first attribute name and the first attribute value matches the at least part of the second pair of the second attribute name and the second attribute value and prohibiting registering of the second image of the paper document to the storage location in response to the determination unit determining that the at least part of the first pair of the first attribute name and the first attribute value does not match the at least part of the second pair of the second attribute name and the second attribute value.

16. The information processing system according to claim 15, further comprising:

a storage unit that stores the electronic data, wherein the initial image comprises:

the first character that indicates the at least part of the first pair of the first attribute name and the first attribute value included in the stored electronic data, and the code image comprises:

(i) the first information image that indicates the at least part of the first pair of the first attribute name and the first attribute value included in the electronic data stored in the storage unit, and (ii) the second information image that indicates the storage location of the electronic data stored in the storage unit.

17. An information processing system comprising:

an image reception unit that receives:

(1) a first document image, the first document image comprising a first character and a code image, wherein the first character indicates at least part of a first pair of a first attribute name and a first attribute value included in electronic data, and the code image comprises:

(i) a first information image that indicates the at least part of the first pair of the first attribute name and the first attribute value included in the electronic data, in a form different from a form of the first character, and (ii) a second information image that indicates a storage location of the electronic data, in the form different from the form of the first character, and (2) a second image of a paper document, the second image of the paper document comprising a second character that indicates at least part of a second pair of a second attribute name and a second attribute value;

a determination unit that determines whether the at least part of the first pair of the first attribute name and the first attribute value matches the at least part of the second pair of the second attribute name and the second attribute value; and an image output unit that prints the second image of the paper document in response to the determination unit determining that the at least part of the first pair of the first attribute name and the first attribute value matches the at least part of the second pair of the second attribute name and the second attribute value.

18. The information processing system according to claim 17, wherein the image output unit prohibits printing of the second image of the paper document in response to the determination unit determining that the at least part of the first pair of the first attribute name and the first attribute value does not match the at least part of the second pair of the second attribute name and the second attribute value.

19. An information processing system comprising:

an image processing apparatus including an image reception unit, a determination unit and a transmission unit; and a document management apparatus including a storage unit, wherein the image reception unit receives:

(i) a first document image including:

a first character that indicates at least part of a first pair of a first attribute name and a first attribute value included in electronic data, and a code image, the code image comprising:

(a) a first information image that indicates the at least part of the first pair of the first attribute name and the first attribute value included in the electronic data, and (b) a second information image that indicates a storage location of the electronic data, and (ii) a second image of a paper document, the second image of the paper document comprising a second character that indicates at least part of a second pair of a second attribute name and a second attribute value, the determination unit determines whether the at least part of the first pair of the first attribute name and the first attribute value matches the at least part of the second pair of the second attribute name and the second attribute value, the transmission unit transmits the second image of the paper document in response to the determination unit determining that the at least part of the first pair of the first attribute name and the first attribute value matches the at least part of the second pair of the second attribute name and the second attribute value, and the storage unit stores the second image of the paper document transmitted by the transmission unit to the storage location.

20. A non-transitory computer-readable medium storing an information processing program that causes a computer to execute operations comprising:

receiving login information of a user;

logging in the user;

receiving a list of documents that lists a paper document allocated to the user who has logged in;

determining one of a plurality of operations to perform based on an input from the user;

wherein the plurality of operations comprises a first operation, the first operation comprising:

outputting a first image to a first document, the first image comprising:

a first character that indicates at least part of a first pair of a first attribute name and a first attribute value included in electronic data; and a code image, the code image comprising:
  (i) a first information image that indicates the at least part of the first pair of the first attribute name and the first attribute value included in the electronic data; and
  (ii) a second information image that indicates a storage location of the electronic data;

scanning the first document and the paper document to obtain the first image and a second image of the paper document, the second image of the paper document comprising a second character that indicates at least part of a second pair of a second attribute name and a second attribute value;

determining whether the at least part of the first pair of the first attribute name and the first attribute value matches the at least part of the second pair of the second attribute name and the second attribute value; and at least one of registering the second image of the paper document, transmitting the second image of the paper document, and outputting the second image of the paper document in response to determining that the at least part of the first pair of the first attribute name and the first attribute value matches the at least part of the second pair of the second attribute name and the second attribute value.

* * * * *